July 21, 1931.  L. E. GODFRIAUX  1,815,562
HYDRAULIC CHUCK
Filed July 28, 1930  2 Sheets-Sheet 1
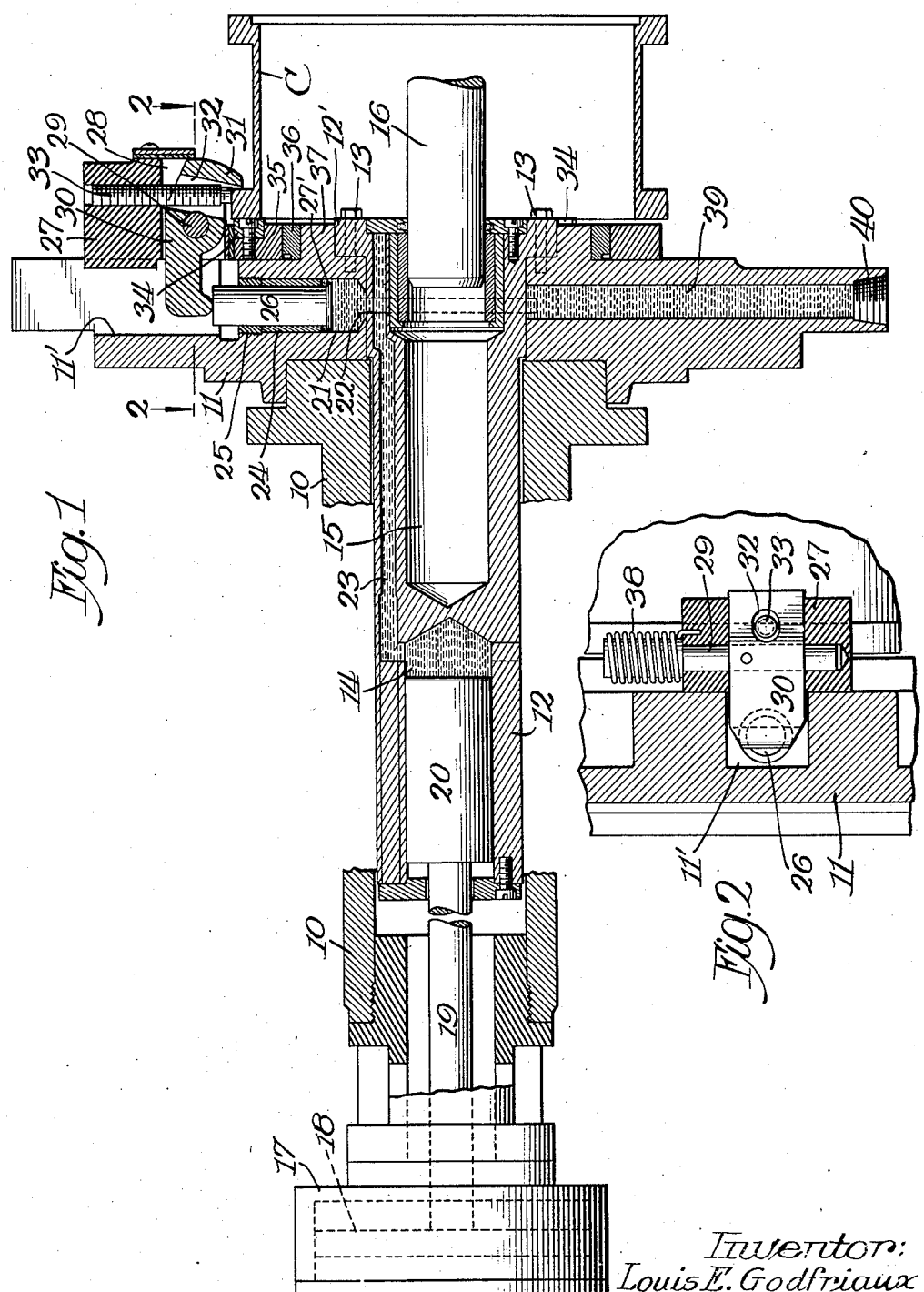
Inventor:
Louis E. Godfriaux
By Fisher, Clapp, Soans + Pond
Attys.

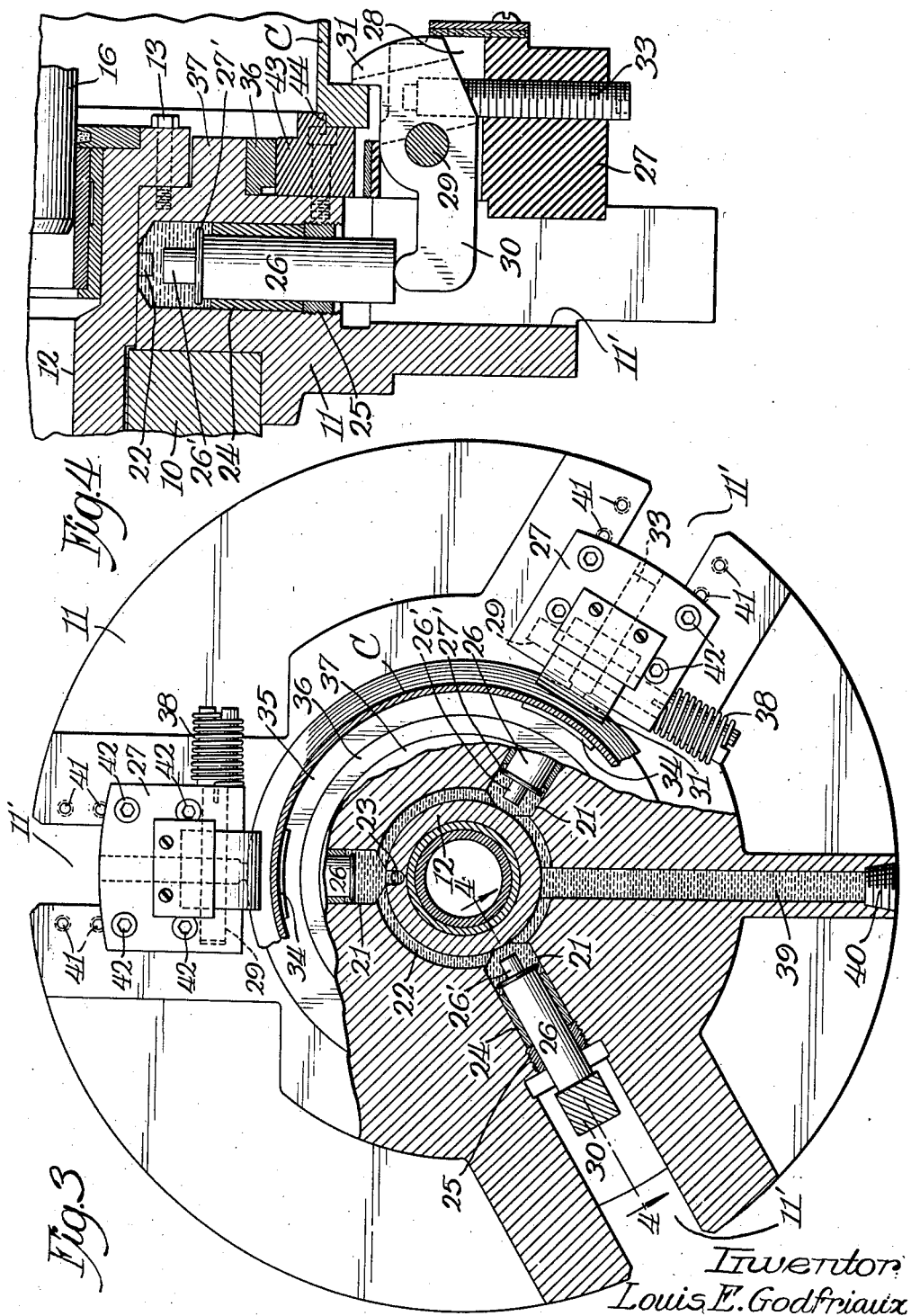

Patented July 21, 1931

1,815,562

UNITED STATES PATENT OFFICE

LOUIS E. GODFRIAUX, OF MADISON, WISCONSIN, ASSIGNOR TO GISHOLT MACHINE COMPANY, OF MADISON, WISCONSIN, A CORPORATION OF WISCONSIN

HYDRAULIC CHUCK

Application filed July 28, 1930. Serial No. 471,111.

This invention relates to the art of chucks for lathes and other machine tools, and has reference more particularly to an improvement in that type of power operated chucks wherein the chuck jaws are engaged with and disengaged from the work by levers pivoted in or on the chuck body, the levers in turn being actuated by the piston rod of an air cylinder mounted on the outer end of the chuck spindle, the latter being hollow and the piston rod extending therethrough and operatively connected to the jaw actuating levers. An example of a chuck of this type is shown in Letters Patent to W. L. Miller, No. 1,188,807, June 27, 1916, although the air cylinder is omitted from the illustration and description thereof.

In a chuck of this type the effective gripping pressure is dependent solely on the air pressure employed, the diameter of the air cylinder, and the leverage of the jaw actuating levers. In such a design, the only practical way to increase the gripping power of the jaws is to increase the diameter of the air cylinder or to increase the pressure per square inch. Increasing the diameter of the air cylinder increases the cost and bulk of the machine, while an increase in the air pressure is not practical on account of the necessity of employing a special air compressor, since practically all air pressure systems in machine shops carry approximately eighty pounds per square inch.

One object of the present invention is to provide a chucking mechanism, which, with an air cylinder of the same size and the same air pressure, will afford a substantial increase of jaw pressure over that obtainable with known chucking devices of the type above referred to, and will even permit the use of a smaller air cylinder to secure equal or greater jaw pressure.

Another object is to provide a construction that will equalize the pressures transmitted to the jaws of the chuck, thus overcoming any differences in the machining of the various parts or in the amount of wear or friction, and insuring a uniform grip at all points on the work.

Other objects are to provide a chuck fixture adapted to handle different sizes of motor frame castings, and also adapted to securely grip both a plain and a counterbored end of a casting.

Still other objects and attendant advantages of the invention will be apparent to persons skilled in the art from the following detailed description, taken in connection with the accompanying drawings wherein I have illustrated one simple and practical embodiment of the invention, and in which—

Fig. 1 is an axial section through a hydraulic chuck embodying novel features of the present invention, the air cylinder appearing in side elevation.

Fig. 2 is a horizontal section taken on the line 2—2 of Fig. 1.

Fig. 3 is a face elevation, viewed from the right of Fig. 1, partly broken away to show the chuck body in section.

Fig. 4 is an enlarged radial section on the line 4—4 of Fig. 3, illustrating the use of an interchangeable work centering plate employed in the second operation on the work, such as a motor frame casting.

My present improvement, generally stated, consists of the introduction in the chuck spindle of an intermediate small hydraulic cylinder and piston between the ordinary air cylinder on the rear of the spindle and the chuck jaws, and the introduction in the chuck body of radial cylinders and plungers that operate the lever jaws of the chuck in work gripping direction and are connected by suitable ducts with the small hydraulic cylinder in the chuck spindle.

Referring to the drawings, at 10 I have shown a hollow chuck spindle that is mounted to rotate in the usual front and rear bearings (not shown), and at its inner end has mounted thereon the chuck body 11. Within this spindle is the sleeve 12, the forward end of which is formed with an annular flange 12' that is secured in a correspondingly shaped recess in the face of the chuck body 11 by any suitable means such as the screw bolts 13. In the rear end of the sleeve 12 is formed a cylindrical chamber 14 constituting, in the present instance, a hydraulic cylinder; and in the forward end of the sleeve is a bore 15 which forms a clearance for the pilot 16 of the boring bar. On the outer end of the spindle 10 is the usual air cylinder 17 containing piston 18, the rod or stem 19 of which is connected to a plunger 20 operating in the hydraulic cylinder 14.

In the chuck body 11 are formed radial cylinders 21 (three being herein shown), and all of these cylinders communicate at their inner ends with an annular duct 22, and the latter is in communication with the hydraulic cylinder 14 through a longitudinal duct 23.

Tightly fitted in each cylinder 21 is a sleeve 24 which is held in position by a threaded bushing 25. Slidable through the sleeve 24 and bushing 25 of each cylinder is a plunger 26 formed on its inner end with an annular flange 27' which, through contact with the inner end of sleeve 24, limits the outward travel of the plunger.

The outer face of the chuck body 11 is radially slotted at 11', and slidably mounted in each of said slots is a block 27. The block 27 is formed with a transverse slot 28 in which is pivoted on a shaft 29 a jaw lever 30. The inner arm of this jaw lever engages with the outer end of the plunger 26, while its outer arm is formed with an inwardly extending jaw 31 that is adapted to grip an end flange on the motor frame casting C. Each jaw lever 30 is formed with a transverse slot 32 to provide clearance for a work centering screw 33 that is mounted radially in the block 27, these screws being used to center the work C in the first operation of boring the frame and facing and counterboring the outer end of the latter.

By the jaws 31, the frame casting is securely clamped against hardened blocks 34 mounted on a ring plate 35, which latter is centered by hardened ring 36 mounted on an annular boss 37 formed on the face of the chuck body 11.

Referring to Fig. 2, the shaft 29 of the jaw lever 30 extends at one end beyond one side of the block 27 and has anchored thereto one end of a torsion spring 38, the other end of which spring is anchored to the block 27. This spring constantly urges the jaw lever in a direction to release the work.

In the chuck body is formed a radial duct 39 (Fig. 1), the inner end of which communicates with the annular duct 22, and the outer end of which is closed by a removable plug 40; this duct 39 constituting a filling or charging duct.

Through the duct 39 the portion of the cylinder 14 in front of the plunger 20, the duct 23, the annular duct 22, the inner portions of the cylinders 21 and the filling duct 39 are all filled with a heavy oil, such as 600W or any other suitable liquid; and, in the operation of the device, the frame casting C having been centered against the hardened blocks 34 by the centering screws 33, compressed air is admitted to the outer end of the air cylinder 17, and the plunger 20 transmits the pressure to the body of oil, forcing the plungers 26 outwardly and causing the jaw levers to powerfully grip the work. In this operation, the air pressure used in cylinder 17 is considerably multiplied at the working ends of the jaw levers. For instance, assuming that the air cylinder has a net area of about 28 square inches, and that the air pressure is 80 lbs. per square inch, this gives a total pressure on the piston of the air cylinder of about 2,250 pounds. Assuming that the area of the piston 20 is 5 square inches, the pressure per square inch exerted thereby would be 2,250 divided by 5 which equals 450 pounds. Assuming that the area of the plunger 26 is 1 square inch, and the leverage of the jaw lever 30 is in the ratio of 2 to 1, the pressure exerted by the jaw 31 on the work would therefore be 900 pounds minus the torsional urge of the spring 38; and due to the fact the several radial cylinders all communicate with each other and with the hydraulic cylinder 14, this pressure is exactly the same on all of the jaws.

When the pressure in the air cylinder is released, the hydraulic pressure is, of course, simultaneously released thereby tending to cause a vacuum in cylinder 14 and the springs 38 not only retract the jaw levers but also force the plungers 26 inwardly and thereby cause the pistons 20 and 18 to back off.

By reference to Fig. 3, it will be observed that two of the three plungers 26 are formed on their inner ends with tits 26' which serve to limit the inward or jaw releasing movements of the said plungers; this tit being omitted from the third plunger. The purpose of these tits is to limit the travel of the two plungers carrying the tits so that the jaws operated by the plungers open only about ⅛ of an inch when the pressure is removed. The third jaw, which has no tit, opens to a greater extent; this arrangement facilitating the chucking of the casting.

By reference to Fig. 3, it will be observed that the chuck body 11 is formed with a group of spaced tapped holes 41 to receive the attaching screws 42 of the blocks 27 so that, in order to enable the fixture to take care of different sizes of motor frame castings the blocks 27 can be adjusted inwardly and outwardly. For machining larger frame castings, the plate 35 with blocks 34 is replaced by another plate suitable to the larger size of casting. When the other end of the casting is to be machined in the second operation, the plate 35 and hardened blocks 34 are replaced by a centering plate 43, as shown in Fig. 4, which has a turned shoulder 44 thereon of a size to fit the counterbore previously formed in the end of the casting during the first operation. In the second operation, the use of the centering screws is not required.

In the above described embodiment of the invention, I have shown the hydraulic cylinder 14 and its discharge duct 23 formed in a sleeve 12, this latter being mounted within the hollow spindle. By employing this construction, the described chucking device can readily be applied to a hollow spindle machine in stock or one that has been shipped; and a further advantage is that the use of a separate sleeve facilitates machining and assembling. It is obvious, however, that the described construction could easily be embodied in a specially formed spindle; and hence the invention, in its broader aspects, is not at all limited to the use of a separate sleeve in which to form the hydraulic cylinder and its discharge duct.

I claim:

1. In a chuck, the combination of a rotary spindle, a chuck body fast on said spindle, work-gripping members mounted on said body, cylinders carried by said body, plungers in said cylinders at one end engaged with said work-gripping members, a duct connecting said cylinders, a chamber in said spindle, a plunger in said chamber, a duct connecting said chamber with said first-named duct, a viscous fluid filling the portion of said chamber in advance of said plunger, ducts, and the portions of said cylinders behind said plungers, and means for applying pressure to the fluid in said chamber.

2. In a chuck, the combination of a rotary spindle, a chuck body fast on said spindle, work-gripping members mounted on said body, cylinders carried by said body, plungers in said cylinders at their outer ends engaged with said work gripping members, an annular duct connecting the inner ends of said cylinders, a chamber in said spindle, a plunger in said chamber, a duct connecting said chamber with said annular duct, a viscous fluid filling the portion of said chamber in advance of said plunger, ducts, and the inner portions of said cylinders behind said plungers, and means for applying pressure to the fluid in said chamber.

3. In a chuck, the combination of a rotary spindle, a chuck body fast on said spindle, work-gripping members mounted on said body, radial cylinders formed in said body, plungers in said cylinders at their outer ends engaged with said work-gripping members, an annular duct in said body connecting the inner ends of said cylinders, a chamber in said spindle, a plunger in said chamber, a duct in said spindle connecting said chamber with said annular duct, a viscous fluid filling the portion of said chamber in advance of said plunger, ducts, and the inner portions of said cylinders behind said plungers, and means for applying pressure to the fluid in said chamber.

4. In a chuck, the combination of a rotary spindle, a chuck body fast on said spindle, work-gripping members mounted on said body, radial cylinders carried by said body, plungers in said cylinders at their outer ends engaged with said work-gripping members, an annular duct connecting the inner ends of said cylinders, a chamber in said spindle, a duct connecting said chamber with said annular duct, a plunger in said chamber, a viscous fluid filling the portion of said chamber in advance of said plunger, said ducts, and the portions of said cylinders behind said plungers, and an air cylinder on the outer end of said spindle having its piston connected to said chamber plunger.

5. In a chuck, the combination of a rotary spindle, a chuck body fast on said spindle, levers pivoted on said body at their outer ends adapted to grip the work, radial cylinders formed in said body, plungers in said cylinders at their outer ends operatively engaged with the inner ends of said levers, an annular duct in said body connecting the inner ends of said cylinders, a chamber in said spindle, a duct in said spindle connecting said chamber with said annular duct, a viscous fluid filling said chamber, ducts, and the inner portions of said cylinders behind said plungers, and means for applying pressure to the fluid in said chamber.

6. In a chuck, the combination of a rotary spindle, a chuck body fast on said spindle, levers pivoted on said body and formed on their outer ends with work-gripping jaws, radial cylinders formed in said body, plungers in said cylinders at their outer ends abutting against the inner ends of said levers, an annular duct in said body connecting the inner ends of said cylinders, a chamber in said spindle, a duct in said spindle connecting said chamber with said annular duct, a viscous fluid filling said chamber, ducts, and the inner portions of said cylinder behind said plungers, means for applying pressure to the fluid in said chamber whereby to rock said levers in a work-gripping direction, and springs operative to rock said levers in a work-release direction when the pressure on the fluid in said chamber is released.

7. In a chuck, the combination of a rotary spindle, a chuck body fast on said spindle, radially adjustable blocks mounted on the face of said chuck body, levers pivoted in said blocks and formed on their outer ends with work-gripping jaws, radial cylinders formed in said body, plungers in said cylinders at their outer ends abutting against the inner ends of said levers, an annular duct in said body connecting the inner ends of said cylinders, a chamber in said spindle, a duct connecting said chamber with said annular duct, a plunger in said chamber, a viscous fluid filling the portion of said chamber in advance of said plunger, said ducts, and the portions of said cylinders behind said plungers, an air cylinder on the outer end of said spindle having its piston connected to said chamber plunger, and springs operative to rock said levers in a work-release direction when the pressure in said air cylinder is released.

8. In a chuck, the combination of a rotary spindle, a chuck body fast on said spindle, blocks mounted on the face of said chuck body, a lever pivoted intermediate its ends in each of said blocks and formed on its forward end with a work gripping jaw, work centering screws mounted in said blocks at their inner ends adapted to engage with the work, and means for applying pressure to the rear ends of said levers.

9. In a chuck, the combination of a rotary spindle, a chuck body fast on said spindle, slotted blocks mounted on the face of said chuck body, a lever pivoted intermediate its ends in the slot of each of said blocks and formed on its forward end with a work gripping jaw, work centering screws mounted in said blocks and extending through the slots of the latter to engage with the work at their inner ends, and means for applying pressure to the rear ends of said levers.

10. In a chuck, the combination of a rotary spindle, a chuck body fast on said spindle, slotted blocks mounted on the face of said chuck body, a slotted lever pivoted intermediate its ends in the slot of each of said blocks and formed on its forward end with a work gripping jaw, work centering screws mounted in said blocks and extending through the slots of said blocks and levers to engage with the work at their inner ends, and means for applying pressure to the rear ends of said levers.

11. In a chuck of the type described, the combination of a rotary spindle, a chuck body fast on said spindle, a group of equally spaced radial cylinders carried by said chuck body, a corresponding number of work gripping levers mounted on said chuck body, plungers in said cylinders adapted to engage with and actuate said levers in work gripping direction, springs actuating said levers in work release direction, means for applying hydraulic pressure to said plungers, and means limiting the lever actuating movement of said plungers.

12. In a chuck of the type described, the combination of a rotary spindle, a chuck body fast on said spindle, a group of three equally spaced radial cylinders carried by said chuck body, a corresponding number of work gripping levers mounted on said chuck body, plungers in said cylinders adapted to engage with and actuate said levers in work gripping direction, springs actuating said levers in work release direction, means for applying hydraulic pressure to said plungers, and tits on the inner ends of two only of said plungers serving to limit the inward or return movement of said two plungers.

13. In a chuck for the machining of cylindrical castings having flanged ends, the combination with a rotary spindle, of a chuck body fast on said spindle formed with an annular boss on its face coaxial with said spindle, a group of levers pivoted in said body and formed on their outer ends with flange clamping jaws, a removable ring plate mounted on said boss against which a flange of the casting is adapted to be clamped by said jaws, and means for actuating said levers in work engaging and work release directions.

14. In a chuck for the machining of cylindrical castings having flanged ends, the combination with a rotary spindle, of a chuck body fast on said spindle formed with an annular boss on its face coaxial with said spindle, a group of levers pivoted in said body and formed on their outer ends with flange clamping jaws, a removable ring plate carrying hardened blocks mounted on said boss against which a flange of the casting is adapted to be clamped by said jaws, radial work-centering screws mounted on said chuck body and adapted to engage the periphery of said flange, and means for actuating said levers in work engaging and work release directions.

15. In a chuck for the machining of cylindrical castings having flanged ends, the combination with a rotary spindle, of a chuck body fast on said spindle formed with an annular boss on its face coaxial with said spindle, a group of levers pivoted in said body and formed on their outer ends with flange clamping jaws, a removable ring plate mounted on said boss against which a flange of the casting is adapted to be clamped by said jaws, said ring plate being formed with an annular shoulder adapted to enter a counter bore in the end of the casting to center the latter, and means for actuating said levers in work engaging and work release directions.

LOUIS E. GODFRIAUX.